P. MÜLLER.
WATER PURIFYING APPARATUS FOR STEAM BOILERS.
APPLICATION FILED MAR. 20, 1908.
988,014.
Patented Mar. 28, 1911.
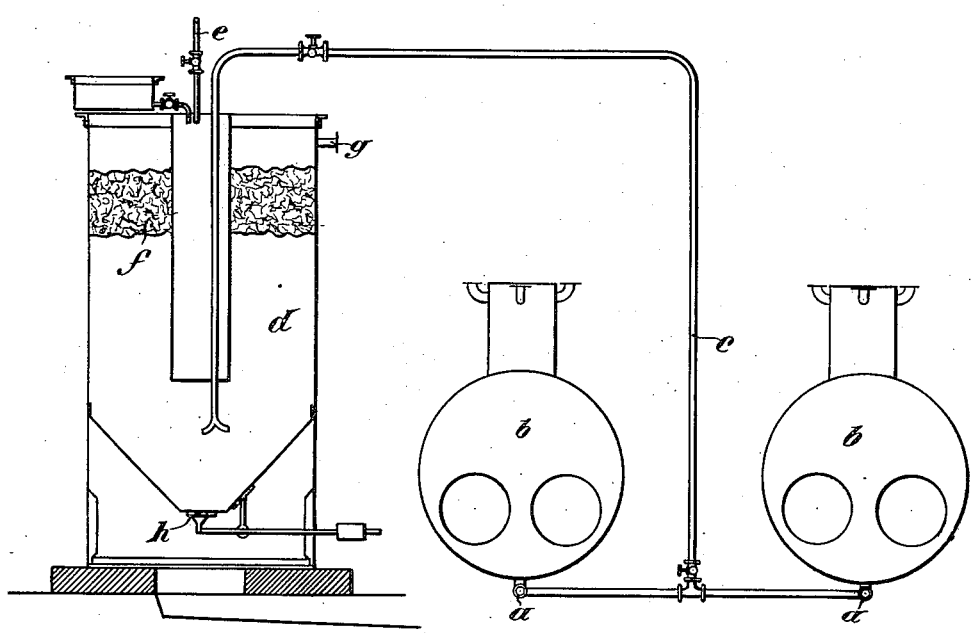

UNITED STATES PATENT OFFICE.

PHILIPP MÜLLER, OF CANNSTATT, GERMANY.

WATER-PURIFYING APPARATUS FOR STEAM-BOILERS.

988,014.    Specification of Letters Patent.    Patented Mar. 28, 1911.

Application filed March 20, 1908. Serial No. 422,258.

*To all whom it may concern:*

Be it known that I, PHILIPP MÜLLER, a subject of the German Emperor, residing at Cannstatt, Germany, have invented certain new and useful Improvements in Water-Purifying Apparatus for Steam - Boilers; and I do hereby declare the following to be a full, clear, and exact description of the invention, such as will enable others skilled in the art to which it appertains to make and use the same.

The present invention relates to a device consisting of the combination of a water purifying apparatus with one or more steam boilers directly, so that the boiler water can circulate between the boilers and the purifier and in which there is supplied to the purifier besides the water delivered to it from the boilers also fresh water. By this device I am enabled to prevent the formation of calcareous deposit in the boiler and also the formation of foam.

In the accompanying drawing the invention is illustrated diagrammatically.

To the discharge cocks, $a$, at the bottom of the boilers, $b$, there is connected the pipe $c$, which leads to a point at the lower portion of the purifier, $d$, as shown. The impure water from the bottom of the boilers is thus conveyed to the bottom portion of the interior of the purifier, said purifier being closed at its top and having a vertical sleeve, $d'$, extending centrally from the cover to a point in the interior near the bottom. The connecting pipe, $c$, extends through this sleeve, as shown and discharges below its lower edge. Above this discharge and in the upper part of the purifier is arranged a horizontal filtering layer, $f$, and above the same is arranged the discharge, $g$, for the purified water, said discharge leading to a reservoir from which the boilers are supplied in a manner well-known. A fresh water pipe, $e$, delivers fresh water to the purifier, said pipe discharging into the sleeve, $d'$, as shown. Sufficient water is thereby added to supply the loss of water by evaporation in the boilers. At the bottom of the purifier there is provided a blow-off valve, $h$, through which the sediment and dirt separated from the water can be discharged from time to time. Closing or dividing valves as required may be arranged in the pipe $c$. By this arrangement the water from the bottom of the boiler, that is at the point where it is the most charged with dirt, sediment and impurities, is conveyed into the purifier where it is forced to pass upwardly through the filtering material and under conditions whereby a portion of the impurities are deposited in the bottom of the purifier, before they reach the filter, and where no deposit of sediment and impurities on the filter and a consequent clogging of the same can arise.

What I claim and desire to secure by Letters Patent is:—

1. A water purifier having a filter in its upper portion, in combination with a vertical sleeve extending from the cover of the purifier to a point in the interior near its bottom, and a feed pipe for water to be purified arranged with said sleeve and arranged to discharge below the lower edge of the sleeve.

2. A water purifier having an interior vertical sleeve open at top and bottom extending to the lower portion of the purifier, in combination with a filtering layer in said purifier, and occupying the space between the sleeve and the walls of the purifier, and in communication with the upper and lower portions of said space, a pipe for feeding water to be purified and arranged to deliver the same below the lower edge of said sleeve.

3. A water purifier having an interior vertical sleeve, open at top and bottom, extending from the top of same to the lower portion of the interior of the same, in combination with a filtering layer in said purifier arranged in the space between the sleeve and the walls of the purifier, a feed pipe for water to be purified arranged within said sleeve and passing to a point below the bottom edge of the same, and a second pipe for delivering fresh water into the sleeve.

In testimony whereof I hereunto affix my signature in the presence of two witnesses.

PHILIPP MÜLLER.

Witnesses:
 ADOLP SEBBERS,
 ERNEST ENTENMANN.